United States Patent
Prochazka et al.

(10) Patent No.: US 10,197,158 B2
(45) Date of Patent: Feb. 5, 2019

(54) MOTOR VEHICLE HAVING A DUAL CLUTCH TRANSMISSION

(71) Applicant: AUDI AG, Ingolstadt (DE)

(72) Inventors: Walter Prochazka, Hepberg (DE); Daniel Brüggmann, Königs Wusterhausen (DE)

(73) Assignee: AUDI AG, Ingolstadt (DE)

( * ) Notice: Subject to any disclaimer, the term of this patent is extended or adjusted under 35 U.S.C. 154(b) by 23 days.

(21) Appl. No.: 15/556,724

(22) PCT Filed: Feb. 25, 2016

(86) PCT No.: PCT/EP2016/053971
§ 371 (c)(1),
(2) Date: Sep. 8, 2017

(87) PCT Pub. No.: WO2016/142181
PCT Pub. Date: Sep. 15, 2016

(65) Prior Publication Data
US 2018/0058577 A1    Mar. 1, 2018

(30) Foreign Application Priority Data
Mar. 10, 2015   (DE) .................. 10 2015 003 407

(51) Int. Cl.
*F16H 61/04*       (2006.01)
*F16H 61/688*      (2006.01)

(52) U.S. Cl.
CPC ... *F16H 61/688* (2013.01); *F16H 2061/0444* (2013.01); *F16H 2306/14* (2013.01)

(58) Field of Classification Search
CPC .......... F16H 61/688; F16H 2061/0444; F16H 2306/14
See application file for complete search history.

(56) References Cited

U.S. PATENT DOCUMENTS

2003/0226416 A1   12/2003  Umemoto et al.
2010/0154584 A1*   6/2010  Hegerath ............... F16H 3/006
                                                    74/661

(Continued)

FOREIGN PATENT DOCUMENTS

CN    104251304 A    12/2014
CN    104302956 A     1/2015

(Continued)

OTHER PUBLICATIONS

German Office Action dated Feb. 1, 2018, in connection with corresponding DE Application No. 10 2015 003 407.3 (7 pgs.).

(Continued)

*Primary Examiner* — David J Hlavka
(74) *Attorney, Agent, or Firm* — Maier & Maier, PLLC

(57) ABSTRACT

A motor vehicle having a drive unit, the power output shaft of which outputs alternately to a first sub-transmission or a second sub-transmission of a dual clutch transmission by way of two separating clutches of a dual clutch. The first sub-transmission has the odd-numbered forward gears and the second sub-transmission has the even-numbered forward gears, and having a transmission control device, which has a driving strategy unit for determining a target gear as a function of input parameters and a shift sequence control unit, with which a gear change from the current gear to the target gear can be controlled.

8 Claims, 2 Drawing Sheets

(56) References Cited

U.S. PATENT DOCUMENTS

2014/0249727 A1    9/2014   Faust
2017/0356545 A1*   12/2017   Sawada .................. F16H 61/12
2018/0023697 A1*    1/2018   Ota ....................... F16H 61/686
                                                                                                                               701/51

FOREIGN PATENT DOCUMENTS

| DE | 601 02 962 T2 | 4/2005 |
| --- | --- | --- |
| DE | 102004058475 A1 | 5/2006 |
| DE | 10 2005 052 824 A1 | 3/2007 |
| DE | 10 2006 015 661 A1 | 10/2007 |
| DE | 102007003921 A1 | 7/2008 |
| DE | 10 2012 208 989 A1 | 12/2012 |
| DE | 10 2011 080 712 A1 | 2/2013 |
| EP | 1302697 A2 | 4/2003 |

OTHER PUBLICATIONS

Chinese Office Action dated Aug. 16, 2018, in connection with corresponding CN Application No. 2016800014677.8 (10 pgs., including English translation).

Notification of Transmittal of Translation of the International Preliminary Report on Patentability dated Sep. 21, 2017, in connection with corresponding international application No. PCT/EP2016/053971 (6 pgs.).

International Search Report dated Jun. 3, 2016 of corresponding International application No. PCT/EP2016/053971; 13 pgs.

\* cited by examiner

Driving program
Gas pedal
Speed
Rocker control
Selector lever

MOTOR VEHICLE HAVING A DUAL CLUTCH TRANSMISSION

FIELD

The invention relates to a motor vehicle having a dual clutch transmission as well as to a method for upshifting to a target gear in such a motor vehicle.

BACKGROUND

A generic motor vehicle has a drive unit, for example, an internal combustion engine, whose power output shaft can be output alternately to two input shafts of a dual clutch transmission, which are coaxially arranged, for example, by way of two separating clutches of the dual clutch transmission. By way of example, in each case, sub-transmissions that are disposed behind one another axially can be activated or deactivated with the input shafts during vehicle operation. A common output shaft, which is arranged parallel to the axle and outputs to the vehicle wheels via a differential, can be allocated to the two input shafts. Fixed and detachable gears are disposed on the shafts of the dual clutch transmission, these gears being grouped into gear sets, with the formation of gear steps, in which the detachable gears can be coupled to the shafts by means of shift clutches. Of the two sub-transmissions, a first sub-transmission has the odd-numbered forward gears and the second sub-transmission has the even-numbered forward gears. The dual clutch transmission can be actuated as an automatic transmission by means of a transmission control device. For this purpose, a determination unit is allocated to the transmission control unit, by means of which a target gear is determined as a function of a plurality of vehicle operating parameters. A shift sequence control unit is also provided, by means of which a gear change from a current gear to the target gear can be controlled.

In a familiar shift sequence control, gear upshifts are always carried out sequentially even in the case of larger gear jumps. That is, when there is a gear change from the current gear to a higher target gear, single upshifts will be carried out, in which only one gear jump from the gear of one sub-transmission to the next-higher gear of the other sub-transmission always occurs.

Such a sequential upshift is perceived as uncomfortable by the driver in a driving situation in which, after an acceleration operation, for example, for an overtaking or passing maneuver, the vehicle transitions into a cruising operation at higher speed. In this driving situation, the acceleration operation is made in fourth gear as an example. After terminating the acceleration operation, an upshift is made to a seventh gear, for example, as the target gear. The gear change from the fourth gear (current gear) to the seventh gear (target gear) is executed in the prior art by sequential single upshifts, in which upshifts are made sequentially, first from the fourth gear (second sub-transmission) to the fifth gear (first sub-transmission), subsequently from the fifth gear to the sixth gear (second sub-transmission), and after that from the sixth to the seventh gear (first sub-transmission). By this successive sequence of single upshifts, in the case of larger gear jumps (from the current gear to the target gear), the target gear will only be reached with a time delay after a long period of upshifting. The single upshifts to the next-higher gear in each case may thus be perceived by the driver as unpleasant or unnecessary, since the actual driver action (i.e., engaging a target gear by means of a rocker control/selector lever or driving strategy/gas pedal) no longer takes place simultaneously with the vehicle response, but rather occurs with a time delay.

A method for the control of an automatic transmission, which is also designed as a dual clutch transmission, is known from DE 10 2007 003 921 A1. The transmission control is designed so that, in addition to the above-defined single upshifting, a multiple upshifting can also take place. The multiple upshifting occurs each time only in odd-numbered gears or only in even-numbered gears, i.e., it does not occur between gears of different sub-transmissions, but rather in the same sub-transmission, for example, an upshift from the fourth gear (second sub-transmission) to the sixth gear (second sub-transmission), whereby the fifth gear (first sub-transmission) is skipped over as intermediate gear. This multiple upshifting makes possible an emergency operation of the dual clutch transmission, in which one sub-transmission can be shifted and the other sub-transmission can no longer be shifted due to a disruption. In this way, the vehicle can be driven safely to the nearest service facility.

SUMMARY OF THE DISCLOSURE

The object of the invention is to provide a motor vehicle having a dual clutch transmission, in which gear upshifts are enabled without loss of comfort for the driver.

According to the characterizing part of patent claim 1, the shift sequence control unit of the transmission control device has an additional enabling module executed as a program module. A direct upshift can be enabled with the enabling module, even for the case when at least two intermediate gears lie between the current gear and a higher target gear. In the case of the direct upshift according to the invention, single upshifts are no longer carried out; rather, a number of intermediate gears can be skipped over. In this case, the number of intermediate gears to be skipped over is two or a multiple of two. Thus, in distinction from the above DE 10 2007 003 921 A1, for the direct upshift, the gear jump is made from the gear of one sub-transmission to a gear of the other sub-transmission. In contrast to DE 10 2007 003 921 A1, shifting occurs without interruption of the power flow, i.e., with permanently closed drive train by way of at least one drive clutch.

With the invention, in the case of larger gear jumps with at least two intermediate gears, upshifting to the target gear is achieved directly to the target gear, or at least with reduced shift processes—in comparison to the prior art. Thus, after a corresponding driver action, the target gear can be engaged with less time delay—in comparison to the prior art. Also, large gear jumps can be carried out with only one upshift or a maximum of two upshifts. The target gear is thus reached clearly more rapidly, so that the transmission response can be directly connected to a driver response.

For the case when two (or a multiple thereof) intermediate gears do not lie between the current gear and a higher target gear, but rather there is only one intermediate gear, the enabling module integrated in the shift sequence control unit blocks the direct upshifting. In this case, the shift sequence control unit carries out the gear change from the current gear to the target gear with at least one single upshift, in which only one gear jump to the next highest gear is always carried out until the target gear is reached.

If a direct gear change is possible (in the case of a triple or five-fold upshift), the gear change occurs directly to the target gear. For an indirect multiple upshifting, on the other hand, the shift process is divided, for example, into a single upshift and a multiple direct upshift. In this case, the shift sequence has at least one direct upshift in combination with at least one single upshift.

For a gear change with a very large gear jump, according to the invention, only one upshift or a maximum of two upshifts can be conducted (i.e., a direct upshift, optionally in combination with a single upshift). In this way, as already mentioned above, the target gear is clearly reached more rapidly.

In a technical design, the direct upshift is enabled or blocked as a function of a driving program that can be selected by the driver, e.g., an automatic mode or a manual mode, and/or by the gear change being carried out by the enabling module. In this way, the upshift module is activated separately for each shift process. Additionally, a minimum drive speed can be established for each (intended) gear change to be carried out.

In a preferred embodiment, the dual clutch transmission has a total of seven forward gears, of which, the first, third, fifth, and seventh gears can be shifted in the first sub-transmission, and the second, fourth, and sixth gears can be shifted in the second sub-transmission.

The invention is especially applicable to a driving situation, in which an acceleration operation, for example, after a start from a traffic light or for an overtaking or passing maneuver, there is a transition into a subsequent cruising operation. The transition from the acceleration operation to the cruising operation is associated with an upshift process, in which the dual clutch transmission shifts from the fourth gear, for example, to the seventh gear, for example. By applying the invention, the direct upshift occurs here, in which the fifth and sixth intermediate gears are skipped over and the seventh gear is engaged directly.

The mode and manner in which sequence the direct upshift according to the invention is integrated into an overall upshift process are variable and are established by the shift sequence control unit. For example, the overall upshift process can be divided into two direct upshifts or into a combination of a direct upshift and a conventional single upshift.

For example, a 2-6 upshift process can be divided into a single upshift in which upshifting occurs from the second gear (second sub-transmission) to the third gear (first sub-transmission) and into a direct upshift, in which upshifting occurs from the third gear (first sub-transmission) directly to the target gear (i.e., the sixth gear in the second sub-transmission).

As an alternative, a 2-6 upshift process can be divided into a direct upshift, in which upshifting occurs from the second gear (second sub-transmission) to the fifth gear (first sub-transmission), and into a single upshift, in which upshifting occurs from the fifth gear (first sub-transmission) to the target gear (i.e., the sixth gear in the first sub-transmission).

The shift operation of the direct upshift according to the invention is basically comparable to that of a single upshift. That is, after engaging the target gear, the next clutch is filled to an application torque and subsequently the torque is delivered to the next clutch (torque overlap). In the following phase, the engine speed is transferred to the speed of the target gear (speed transfer) via an engine torque reduction required by the transmission control device. The times for the torque overlap and the speed transfer can be varied depending on the gear jump (triple or five-fold) and the current state of the vehicle, for example, the driver's command/engine torque or target gear. The regulation of the clutch torques and the calculation of the engine torque reduction are carried out as in the case of a familiar single upshift.

As mentioned above, in DE 10 2007 003 921 A1, a multiple upshift takes place exclusively in the same sub-transmission (for example, from the fourth gear to the sixth gear), and in fact without intermediate activation of the other sub-transmission in the case of a fully open drive train (i.e., both clutches are open simultaneously). In distinction to this, according to the invention, in the case when both the current gear as well as the target gear are allocated to the same sub-transmission (for example, the first sub-transmission), at least one direct upshift occurs to a gear of the other sub-transmission (for example, the second sub-transmission), which lies directly beneath the target gear. Subsequently, a conventional single upshift to the target gear takes place. In distinction from the above DE 10 2007 003 921 A1, thus the gear change to a higher target gear is executed not without the intermediate activation of the other sub-transmission, but with it. In contrast to DE 10 2007 003 921 A1, shifting occurs without interruption of the power flow, i.e., with permanently closed drive train by way of at least one drive clutch.

The advantageous embodiments and/or enhancements of the invention explained above and/or reproduced in the dependent claims—except, for example, in cases of clear dependences or incompatible alternatives—can be applied individually, but also together in any combination.

BRIEF DESCRIPTION OF THE DRAWINGS

The invention and its advantageous embodiments and enhancements as well as the advantages thereof will be explained in more detail below based on drawings.

Herein.

DETAILED DESCRIPTION OF THE DRAWING

Figure 1:
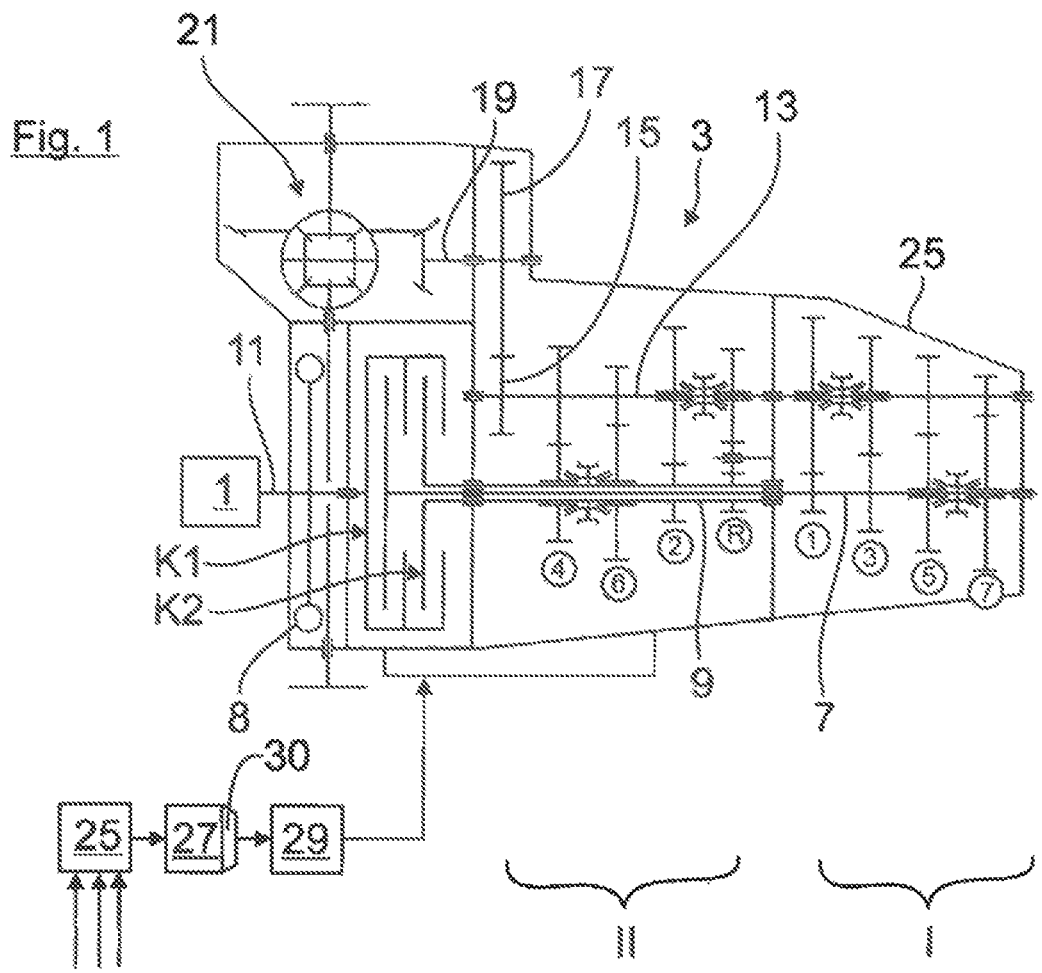
FIG. 1 shows a schematic block diagram of a dual clutch transmission for a motor vehicle with allocated transmission control.

In FIG. 1, a drive assembly of a motor vehicle essentially comprises an internal combustion engine 1 and a dual clutch transmission 3. The dual clutch transmission 3 has two input shafts 7, 9, which are arranged coaxially and which can be connected alternately with the engine crankshaft 11 of the internal combustion engine by way of two hydraulically actuatable multi-plate clutches K1, K2, to transfer torque, and in fact by way of an upstream torsional vibration damper. In FIG. 1, the input shaft 9 is a hollow shaft, within which the input shaft 7 is coaxially arranged.

The dual clutch transmission 3 comprises here, by way of example, a total of seven forward gears and one reverse gear, which are made up of corresponding gear sets, each having a detachable gear and a fixed gear, which can be shifted in the known way via shift clutches (i.e., dual synchronous clutches, here single or multiple synchronizations) and are divided into two sub-transmissions I and II.

The sub-transmission II here has the even-numbered forward gears (that is, second gear, fourth gear, sixth gear) as well as the reverse gear R, which can be activated via the hollow input shaft 9 and by means of the second separating clutch K2. The sub-transmission I has the odd-numbered forward gears (that is, first gear, third gear, fifth gear, and seventh gear), which can be activated by way of the first input shaft 7 and by means of the first separating clutch K1. The output gears of the gear sets forming the gear steps are all arranged on a common output shaft 13 parallel to the axis. The output shaft 13 drives the drive shaft of an axle differential 21 by way of a gear step with front gears 15, 17.

The dual clutch transmission 3 can be actuated as an automatic transmission by means of a transmission control device 23. With respect to a simple understanding of the invention, the software structure of the transmission control device 23 is shown only greatly simplified in FIG. 1, insofar as is necessary for understanding the invention. Consequently, the transmission control device 23 comprises a drive strategy unit 25, by means of which a target gear is determined during vehicle operation as a function of a plurality of input parameters, e.g., the gas pedal, the driving speed, the rocker control, the selector lever, etc. The thus-determined target gear is directed to a shift sequence control unit 27, which calculates the current gear and the next gear. In the shift sequence control unit 27, an enabling module 30 determines whether or not a multiple upshift (i.e., direct upshift), which will be described later, can be enabled. In addition, the shift sequence control unit 27 controls a dividing of the upshift process into single/multiple upshifts.

The shift sequence control unit 27 is connected by signals to an upshift module 29, which, among other things, actuates the transmission/clutch actuator for implementing an upshift process. The upshift module 29 controls a gear change from the current gear to the next gear. In addition, the upshift module 29 can be accessed many times if needed, for example, for dividing into single/direct upshifts.

As mentioned above, the shift sequence control unit 27 has an enabling module 30, with which a direct upshift can be enabled. The direct upshift is then enabled if at least two intermediate gears lay between the current gear and a higher target gear. In the case of the direct upshift, single upshifts are no longer carried out; rather, a number of intermediate gears can be skipped over. The number of intermediate gears to be skipped over is two or a multiple of two in this case.

Such a direct upshift is also enabled as a function of the driving program selected by the user and the gear change to be carried out (for example, from first to fourth gear, from second to fifth gear, etc.) and is activated separately for each shift process. If a direct upshift is not enabled, an upshift process is implemented, in which upshifting is carried out by conventional single upshifts to the target gear. A single upshift is to be understood according to the invention when only one gear jump is always carried out, from one gear to the next higher gear, i.e., no intermediate gears are skipped over.

Figure 2:
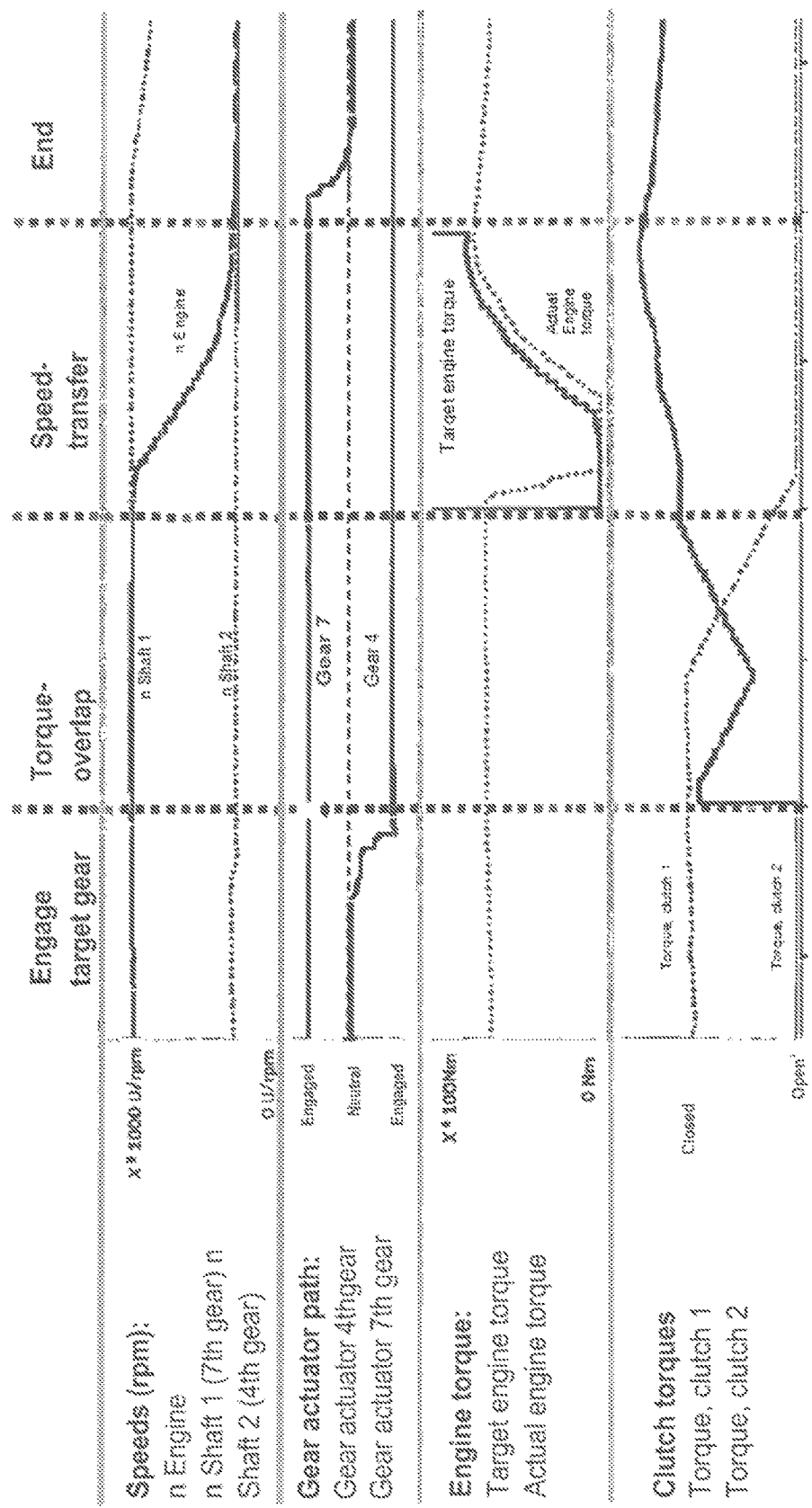
FIG. 2 shows diagrams that illustrate, for example, a 4-7 upshift process that is carried out with a direct upshift according to the invention.

Diagrams are shown in FIG. 2, on the basis of which, for example, a 4-7 upshift process is illustrated, which is carried out with a direct upshift according to the invention, from the current fourth gear to the seventh gear (target gear). The shift sequence control indicated in FIG. 2 is basically comparable to that of a conventional single upshift. That is, after engaging the target gear, the next clutch is filled to an application torque and subsequently the torque is delivered to the next clutch (torque overlap). In the following phase, the engine speed is transferred to the speed of the target gear (speed transfer) by way of an engine torque reduction required by the transmission control device. The times for the torque overlap and the speed transfer can be varied depending on the gear jump (triple or five-fold) and the current state of the vehicle, for example, the driver's command/engine torque or target gear. The regulation of the clutch torques and the calculation of the engine torque reduction are carried out as in the case of a familiar single upshift. The sequence of a familiar single upshift in overrun can also be transferred to a multiple upshift in overrun.

The invention claimed is:

1. A motor vehicle comprising:
a drive unit, a power output shaft of which outputs alternately to a first sub-transmission or a second sub-transmission of a dual clutch transmission by way of two separating clutches of a dual clutch, wherein the first sub-transmission has the odd-numbered forward gears and the second sub-transmission has the even-numbered forward gears, and having a transmission control device, which has a driving strategy unit for determining a target gear as a function of input parameters, and a shift sequence control unit, with which a gear change from the current gear to the target gear can be controlled, wherein the shift sequence control unit has an enabling module, which, when at least two intermediate gears lie between the current gear and a higher target gear, enables a direct upshift, by which a number of intermediate gears are skipped over, wherein the number of intermediate gears is two or a multiple of two.

2. The motor vehicle according to claim 1, wherein when the direct upshift is not enabled and there is the gear change from the current gear to the higher target gear, the shift sequence control unit carries out at least one single upshift, in which a gear jump to the next higher gear can always be carried out.

3. The motor vehicle according to claim 1, wherein, for a gear change, the shift sequence comprises at least one direct upshift in combination with at least one single upshift.

4. The motor vehicle according to claim 1, wherein the shift sequence control unit detects a driving program selectable by a driver, and detects an intended gear change, the direct upshift can be carried out or cannot be carried out, depending on the intended gear change and the driving program.

5. The motor vehicle according to claim 1, wherein the dual clutch transmission has a total of seven forward gears, of which, the first, third, fifth, and seventh gears can be shifted in the first sub-transmission, and the second, fourth, and sixth gears can be shifted in the second sub-transmission.

6. The motor vehicle according to claim 5, wherein during vehicle operation, an acceleration operation with subsequent cruising operation takes place with an upshift process, in which the dual clutch transmission can be upshifted from the fourth gear as the current gear to the seventh gear as the target gear, the upshift process can be implemented with the direct upshift, in which the fifth and sixth intermediate gears can be skipped over and the seventh gear can be engaged directly.

7. The motor vehicle according to claim 1, wherein when both the current gear as well as the target gear are allocated to the one sub-transmission, the upshift process is divided into at least the direct upshift from the current gear to an intermediate gear of the other sub-transmission, which lies directly below the target gear, and into a single upshift to the target gear.

8. The motor vehicle according to claim 1, wherein a direct upshift into the highest forward gear can be enabled by a rocker control or a tip action on the selector lever.

* * * * *